United States Patent [19]
Yomtoubian

[11] Patent Number: 5,895,438
[45] Date of Patent: Apr. 20, 1999

[54] INLINE DISK TESTER

[75] Inventor: Ruben Yomtoubian, Saratoga, Calif.

[73] Assignee: Hitachi Computer Products (America), Inc., Santa Clara, Calif.

[21] Appl. No.: 08/771,985

[22] Filed: Dec. 23, 1996

[51] Int. Cl.$^6$ .................................................. G06F 11/00
[52] U.S. Cl. ........................ 702/35; 702/82; 702/183; 702/186; 360/31; 369/53; 369/58; 369/56; 395/182.06; 395/183.18; 371/21.6
[58] Field of Search ........................... 364/507, 506, 364/550, 551.01, 480, 481, 488, 554, 579, 580; 360/31, 51, 53, 45, 49; 395/182.03, 182.06, 183.01, 183.18, 183.2; 371/21.6, 21.1, 24, 25.1, 10.2, 40.15; 369/58, 54, 47, 53, 56; 318/434; 386/113, 126; 702/35, 36, 57–59, 80, 82, 83, 183, 185, 186, 108

[56] References Cited

U.S. PATENT DOCUMENTS

| | | | |
|---|---|---|---|
| 4,809,088 | 2/1989 | Lofgren et al. | 360/31 |
| 4,811,124 | 3/1989 | Dujari et al. | 360/49 |
| 4,953,165 | 8/1990 | Jackson | 395/183.2 |
| 4,967,155 | 10/1990 | Magnuson | 360/31 |
| 4,969,139 | 11/1990 | Azumatani | 369/54 |
| 5,047,874 | 9/1991 | Yomtoubian | 360/31 |
| 5,075,804 | 12/1991 | Deyring | 360/53 |
| 5,109,304 | 4/1992 | Pederson | 360/51 |
| 5,121,263 | 6/1992 | Kerwin et al. | 360/53 |
| 5,157,666 | 10/1992 | Chen et al. | 371/21.1 |
| 5,210,860 | 5/1993 | Pfeffer | 395/183.18 |
| 5,271,018 | 12/1993 | Chan | 371/10.2 |
| 5,313,626 | 5/1994 | Jones et al. | 395/182.03 |
| 5,422,890 | 6/1995 | Klingsporn et al. | 371/21.6 |
| 5,530,687 | 6/1996 | Yamaguchi | 369/54 |
| 5,557,183 | 9/1996 | Bates | 318/434 |
| 5,640,286 | 6/1997 | Acosta et al. | 360/49 |
| 5,732,050 | 3/1998 | Horie | 369/54 |
| 5,748,589 | 5/1998 | Shimizu | 369/58 |

OTHER PUBLICATIONS

"Smart Chip Knows When to Call it Quits;" Ashley and Kaul, IBM Microelectronics; Data Storage, Nov./Dec. 1996.

*Primary Examiner*—James P. Trammell
*Assistant Examiner*—Hal Dodge Wachsman
*Attorney, Agent, or Firm*—Graham & James LLP

[57] ABSTRACT

The present invention is an inline tester for analyzing the integrity of a disk drive. Structurally, the inline tester includes a set of statistical and diagnostic routines included in the ROM of a disk drive and a diagnostic logic section included in the drive's logic board. In initial use, the inline tester reconfigures the drive, making the drive less tolerant of flaws within the drive's media. The drive is also reconfigured to enable error detection and disable error correcting codes as well as device retries. Each sector of the media is then tested with multiple test patterns and failing sectors are added to a list of suspected sectors. At the conclusion of testing, the drive is restored to its normal operating configuration with error correcting codes and device retries enabled. Later, each sector in the list of suspected sectors is re-tested. Sectors that fail are added to the drive's list of bad sectors and are replaced by an alternate sector allocated from a reserved portion of the drive.

16 Claims, 4 Drawing Sheets

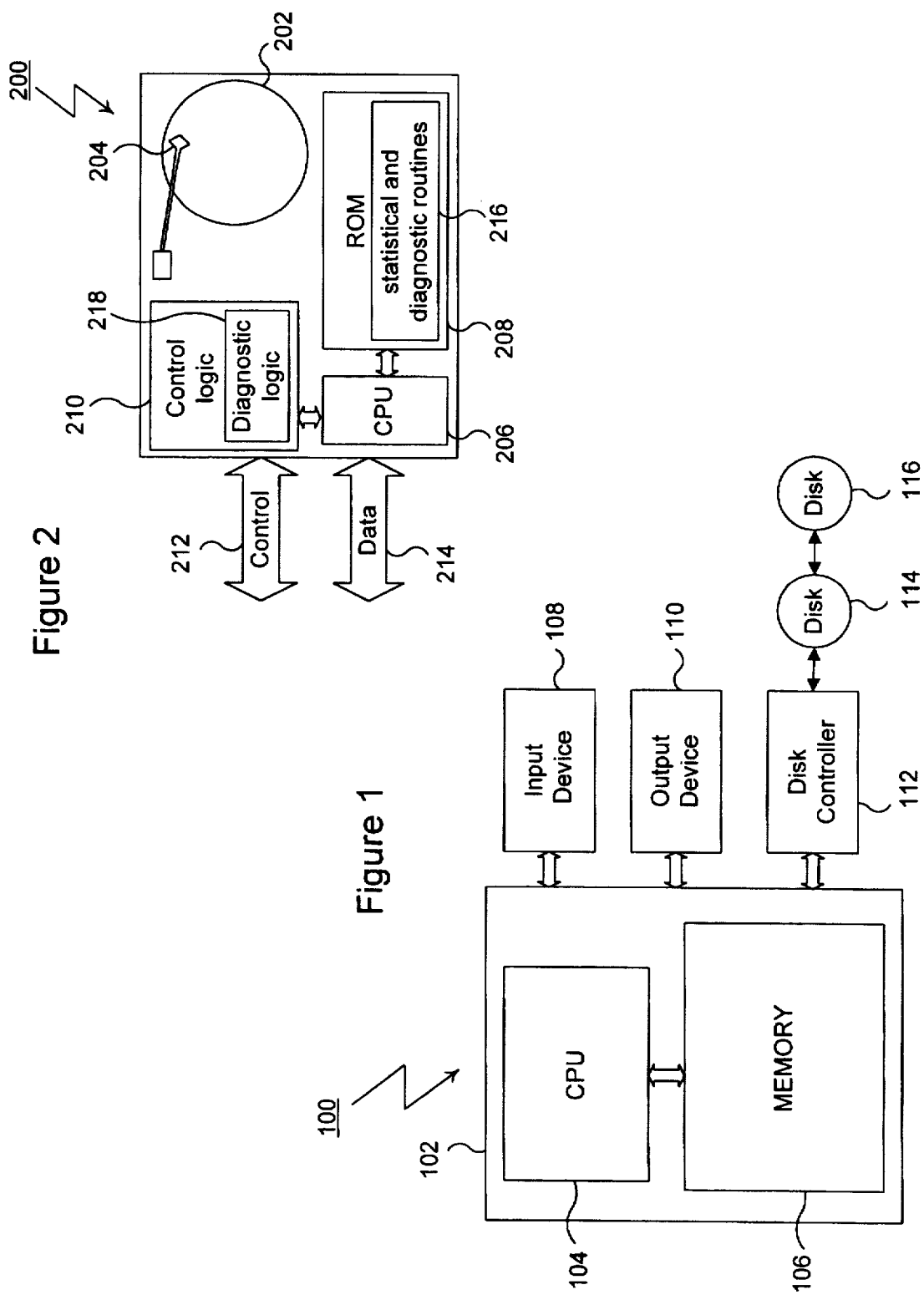

INLINE DISK TESTER

FIELD OF THE INVENTION

This present invention relates to the detection of flaws within the media of a computer disk drive. More specifically, the present invention is a method and apparatus for self-testing of a disk drive during manufacture and use.

BACKGROUND OF THE INVENTION

Normally, computer hard disks are subject to a number of differing analog and digital tests as part of the manufacturing process. Fundamentally, these tests are aimed at two separate, although related goals. The first of these goals is the detection of bad, or inoperable, disk drives that, for whatever reason, do not fall within required manufacturing specifications. The second goal of drive testing is the construction of a drive flaw map. During flaw map construction, each sector within the magnetic media of the disk is repeatedly tested. Sectors that are inoperable are mapped to new sectors allocated from a reserved portion of the disk drive. In some cases, of course, a drive will be found to have too many flaws, and the drive will fall outside of required manufacturing specifications.

Traditionally, testing of disk drives has been performed by devices known as drive testers, a process that has several disadvantages. One such disadvantage is caused, in part, by the rapid growth in disk drive technology which has increased drive capacity and performance at a rapid rate. Unfortunately, the performance and capacity of disk drive testers has not matched the rapid pace of disk drive development. As a result, testing of drives has become an increasingly time consuming part of the manufacturing process. This problem is compounded by the relative expense of disk drive testers which limits the number of testers that may be employed economically on a single manufacturing line.

A second disadvantage associated with traditional disk drive testers is the inability of such devices to provide the type of failure prediction that may be usefully employed in high reliability computing environments. More specifically, it is generally the case that disk drives experience an increasing number of defects over the life-span of the drive. These defects, which arise after the drive has left the manufacturing environment, are known as "grown defects." Unfortunately, the great size of modern disk drives has made it relatively impractical to exhaustively re-test a functioning drive.

SUMMARY OF THE INVENTION

The present invention is an internal, or inline, tester for computer disk drives. Structurally, the present invention includes a diagnostic logic section and a set of statistical and diagnostic routines. The diagnostic logic section is included within the logic board of the disk drive and the statistical and diagnostic routines are included in the drive's read-only memory. Functionally, the statistical and diagnostic routines and the diagnostic logic work together to provide a method and apparatus for self-testing of the disk drive, both during manufacture, and during later operation.

The initial use of the present invention will generally occur during the manufacture of the drive itself. During this initial use, the drive tester adjusts several run-time parameters to selectively control the tolerance of the drive to flaws within the media. Initially, these parameters are set to levels that give the drive a tolerance that is less than its normal operational tolerance. This decreased tolerance makes the drive less tolerant of flaws within the drive media. The drive is also reconfigured to enable the detection of recoverable errors. Generally, this is performed by disabling device retries and disabling the use of error correcting codes.

With the tolerance of the drive set to its initial level, the media of the drive is exhaustively tested. As the drive is tested, sectors that generate errors are added to a list of suspected sectors. The list of suspected sectors is stored in a reserved area of the disk.

After construction of the list of suspected sectors, the inline tester readjusts the run-time parameters to give the drive a normal tolerance to flaws within the media. A second phase of testing is then initiated to re-test each sector in the list of suspect sectors. Sectors in the list of suspected sectors that fail the second phase of testing are removed from the list of suspected sectors and added to a list of delta defects. These sectors may also be reassigned so that replacement sectors are used in the place of the failing sectors. At the completion of the second phase of testing, the use of error correcting codes is re-enabled and the number of device retries is set to a normal level. The second phase of testing may be repeated at any time during the life of the drive to maintain the list of suspected sectors and list of delta defects in an up-to-data condition.

In accordance with the purpose of the invention, as embodied and broadly described herein, the invention is a method for testing the media of a disk drive, the method being executable by the disk drive and comprising the steps of: enabling error detection for the disk drive, reconfiguring the drive to decrease the tolerance of the drive to defects within the media, testing, in a first testing step, each sector in the media, and adding each sector that generates an error during the first testing step to a list of suspected sectors.

In further accordance with the purpose of this invention, as embodied and broadly described herein, the invention is a method for testing the media of a disk drive, the method being executable by the disk drive and comprising the steps of: testing each sector in the list of suspected sectors, adding each sector that generates an error during the testing step to a list of bad sectors, and allocating an alternate sector for each sector that generates an error during the testing step.

Objects and advantages of the invention will be set forth in part in the description that follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 1 is a block diagram of a computer system in accordance with a preferred embodiment of the present invention.

FIG. 2 is a block diagram of a disk drive in accordance with the present invention.

DETAILED DESCRIPTION OF THE PREFERRED EMBODIMENTS

Figure 4:
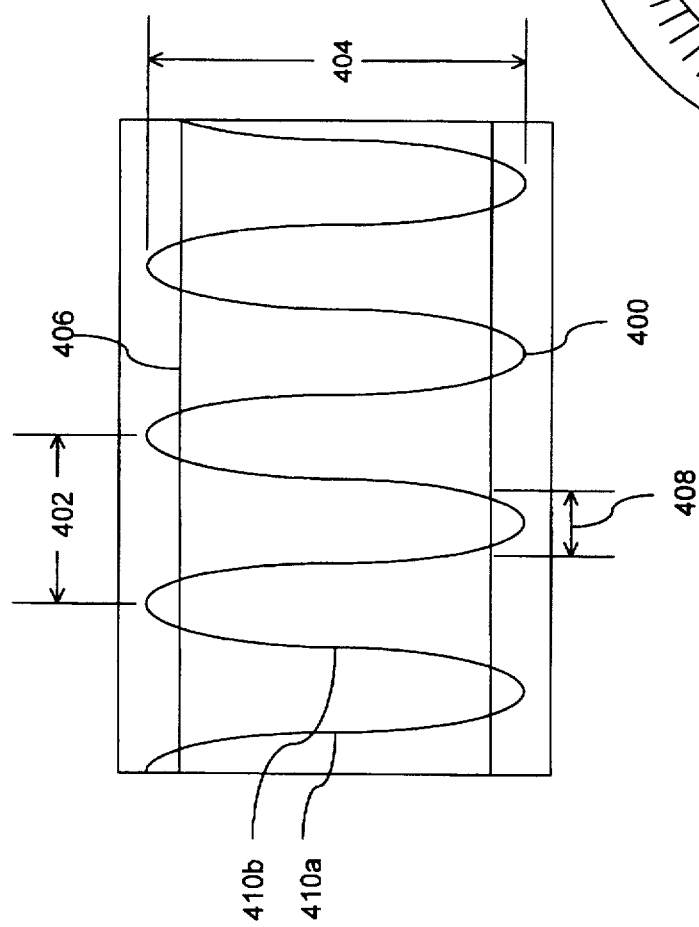
FIG. 4 is an idealized representation of the analog signal generated by a read/write head as used in the disk drive of the present invention.

Reference will now be made in detail to the preferred embodiments of the invention, examples of which are illustrated in the accompanying drawings. Wherever possible, the same reference numbers will be used throughout the drawings to refer to the same or like parts.

In FIG. 1, a computer system 100 is shown as a representative environment for the present invention. Structurally, the computer system 100 includes a host computer 102 that, in turn, includes a central processing unit, or CPU 104, and memory 106. An input device 108 and an output device 110 are connected to the host computer 102 and represent a wide range of varying I/O devices such as keyboards, modems, network adapters, printers and displays. FIG. 1 also shows that a disk controller 112 is connected to the host computer 102 and that a first disk drive 114 and a second disk drive 116 are connected to the disk controller 112. Disk controller 112, first disk drive 114 and second disk drive 116 are, of course, representative and may be implemented as SCSI or other standardized devices.

Turning now to FIG. 2, a representative hard disk drive is shown and generally designated 200. Hard disk drive includes a disk assembly 202 and a read/write head assembly 204. Both disk assembly 202 and read/write head assembly 204 are shown generically, indicating that the present invention may be used in combination with a variety of disk drive technologies. Disk drive 200 also includes a central processing unit, or CPU 206, a read-only memory, or ROM 208, and control logic 210. Finally, disk drive 200 is shown to include a control bus 212 and a data bus 214. Fundamentally, the disk drive 200 functions to transfer data between disk assembly 202 and data bus 214 in response to commands passed over control bus 212. The transfer of this data is coordinated by CPU 206 which responds to each command on control bus 212 by executing program routines stored in ROM 208. As CPU 206 executes the routines stored in ROM 208, the CPU 208 manipulates the control logic 210 that, in turn, causes the disk drive 200 to move data between the data bus 214 and the disk assembly 202.

The present invention is an internal, or inline, tester for computer disk drives, such as disk drive 200. Structurally, the present invention includes a set of statistical and diagnostic routines 216 and a diagnostic logic section 218. The diagnostic logic section 218 is included within the control logic 210 of the disk drive 200 and the statistical and diagnostic routines are included in the ROM 208. Functionally, the statistical and diagnostic routines 216 and the diagnostic logic 218 work together to provide a method and apparatus for self-testing of the disk drive 200, both during manufacture, and during later operation.

Figure 3:
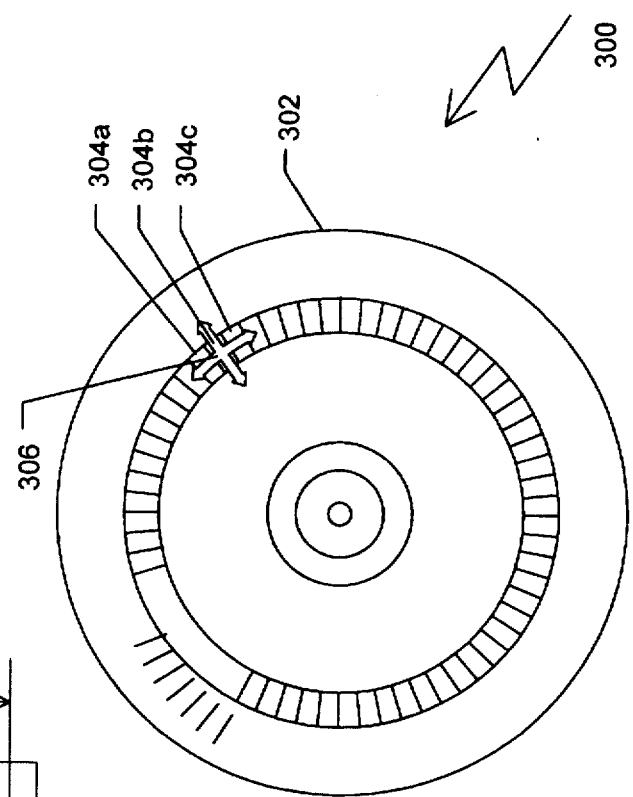
FIG. 3 is an idealized representation of a disk platter as used in the disk drive of the present invention.

As part of the method of the present invention, the statistical and diagnostic routines 216 and diagnostic logic section 218 are used to selectively increase, or decrease, the tolerance of the disk drive 200 to defects within the media of the disk 202. Increasing or decreasing the tolerance of the disk drive 200 to media defects is accomplished using several methods, the first of which may be more readily appreciated by reference to FIG. 3. In FIG. 3, an idealized disk drive platter is shown and generally designated 300. Platter 300 includes a representative track 302 and representative sectors 304a, 304b and 304c. As may be appreciated, there is an optimal position for reading and writing each sector 304. The optimal position is a combination of the physical location of read/write head assembly 204 and the timing associated with the read or write operation. In the case of sector 304b, this position is shown symbolically and designated 306. Alterations made to position 306 will decrease the ability of the disk drive 200 to tolerate defects within the media of disk assembly 202. For example, the track offset of read/write head assembly 204 may be moved slightly to position 306 either to the inside or the outside of track 302. In either case, the tolerance of disk drive 200 to media defects will be decreased.

A second method for decreasing the tolerance of disk drive 200 to media defects involves reconfiguration of the circuitry used by the disk drive 200 during disk read operations. More specifically, during a read operation, read/write head 204 produces an analog signal that corresponds to the magnetic polarization of the particular portion of the disk 202 that is being read. An idealized signal of this type is shown in FIG. 4 and generally designated 400. Signal 400 includes peaks, of which peaks 402a and 402b are representative. The idealized signal 400 is converted into a digital signal by a circuit known as a discriminator. In the discriminator, peaks 402 that exceed a threshold voltage 404a are transformed into digital ones. Similarly, peaks 402 that fall below a threshold voltage 404b are transformed into digital zeros.

Preferably, the discriminator uses a read window, such as the read window 406 shown in FIG. 4. The read window is used to define the portion of signal 400 where the discriminator expects that a peak 402 will occur. The width of the read window 406 is tailored to optimize operation of the disk drive 200. Specifically, The width of the read window 406 is tailored to minimize the number of missing bit errors and extra bit errors experienced by the disk drive 200.

Based on the foregoing, it may be appreciated that several methods exist for effecting the output of the discriminator circuit. For example, if the threshold voltage 404a is increased, fewer peaks 402 will exceed the threshold voltage 404a. In terms of the disk 202, there may be portions of the disk 202 that produce an analog signal 400 that marginally exceeds the threshold voltage 404a under normal conditions. If the threshold voltage 404a is increased, however, these portions may be unable to exceed the increased threshold voltage 404a. In this fashion, the tolerance of the disk drive 200 to portions of the disk 202 that produce marginal voltages may be effectively decreased.

Alternately, if the width of the read window 408 is altered, there will once again be marginal portions of the analog signal 400 that will no longer yield the correct digital value. In terms of the disk 202, this corresponds to disk regions that fail to produce the required voltage for the required time period or that fail to produce the required current at the required time. Once again, the tolerance of the disk drive 200 to portions of the disk 202 that produce marginal analog signals 400 is effectively decreased.

Figure 5:
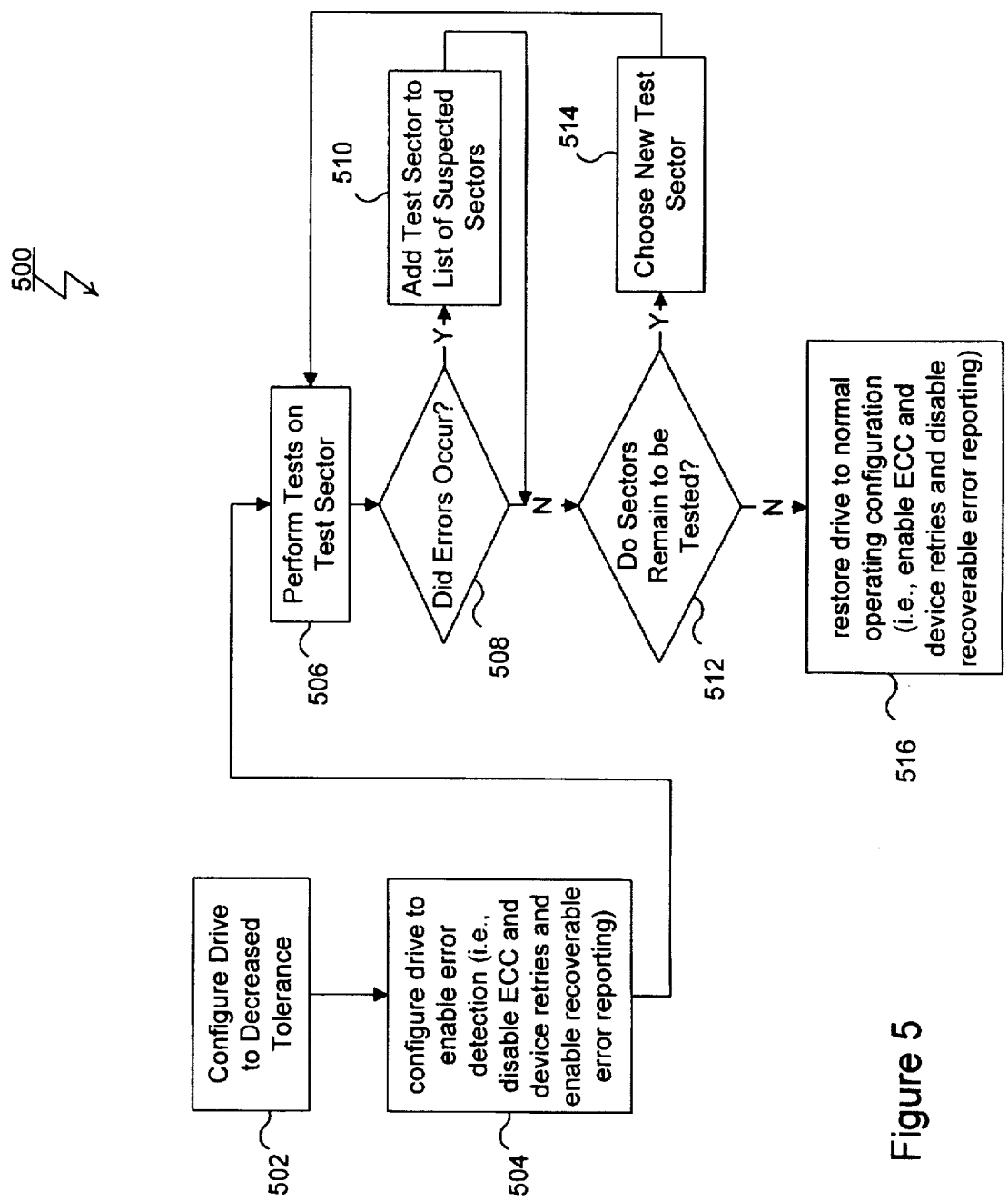
FIG. 5 is a flow chart showing the steps performed by the flaw map construction method of the present invention.

Use of the present invention begins with the construction of a list of suspected sectors. This will generally occur during the manufacture of the disk drive 200. The method for construction of the list of suspected sectors is shown in FIG. 5 and generally designated 500. Method 500 begins with step 502 where the statistical and diagnostic routines 216 and diagnostic logic section 218 configure the disk drive 200 to decrease tolerance of the disk drive 200 to media defects. This configuration is accomplished by adjusting the disk drive 200 so that read/write head 204 is offset either to the inside or the outside of the optimal position for accessing tracks 302 within the disk 202. Additionally, the threshold voltages 404a and 404b and the width of the read window 408 are set at non-optimal levels.

In step 504, the disk drive 200 is further configured by the statistical and diagnostic routines 216 and diagnostic logic section 218 to enable the detection of recoverable errors. More specifically, it is generally the case that disk drives, such as disk drive 200, have a number of features that prevent or mask the occurrence of recoverable errors. These include the use of error correcting codes as well as routines that cause operations that fail initially to be retried multiple times. In step 504, these error correcting and masking techniques are disabled. Specifically, in step 504, recoverable error reporting is enabled, and the use of error correcting codes and device retries are disabled.

In step 506 a sector of the disk 202 is tested. Preferably, this is accomplished by writing a test pattern into the sector followed by reading the same sector. The steps of writing and reading may be repeated multiple times using multiple test patterns. In step 508 the read and write operations of step 506 are checked for errors. In the case that errors have occurred, execution continues at step 510 where the sector being tested is added to a list of suspected sectors. The list of suspected sectors is a list that contains one entry for each sector that is found to produce errors during method 500. These sectors are suspect because they produce errors when tested after the tolerance of the drive 200 has been reduced in step 502. These sectors are not, however, considered to be faulty because they may function without error when the drive 200 is configured to have normal tolerance. The list of suspected sectors is maintained in a reserved area of the disk 202.

Step 512 makes a determination as to whether more sectors remain to be tested. In the case that more sectors remain, execution continues at step 514 where a new sector is selected for testing. In general, since the testing of method 500 is intended to be exhaustive, steps 512 and 514 will contain a simple iterative test that steps through each sector in the disk 202. After selection of a new sector for testing in step 514, execution returns to step 506 where testing is repeated for the new sector. Thus, the process of selecting a sector and testing the sector are repeated until step 512 determines that no sectors remain to be tested. In this case, execution ends at step 516 where the drive 200 is reconfigured to its normal operating configuration. This involves disabling recoverable error reporting, and enabling the use of error correcting codes and device retries.

Figure 6:
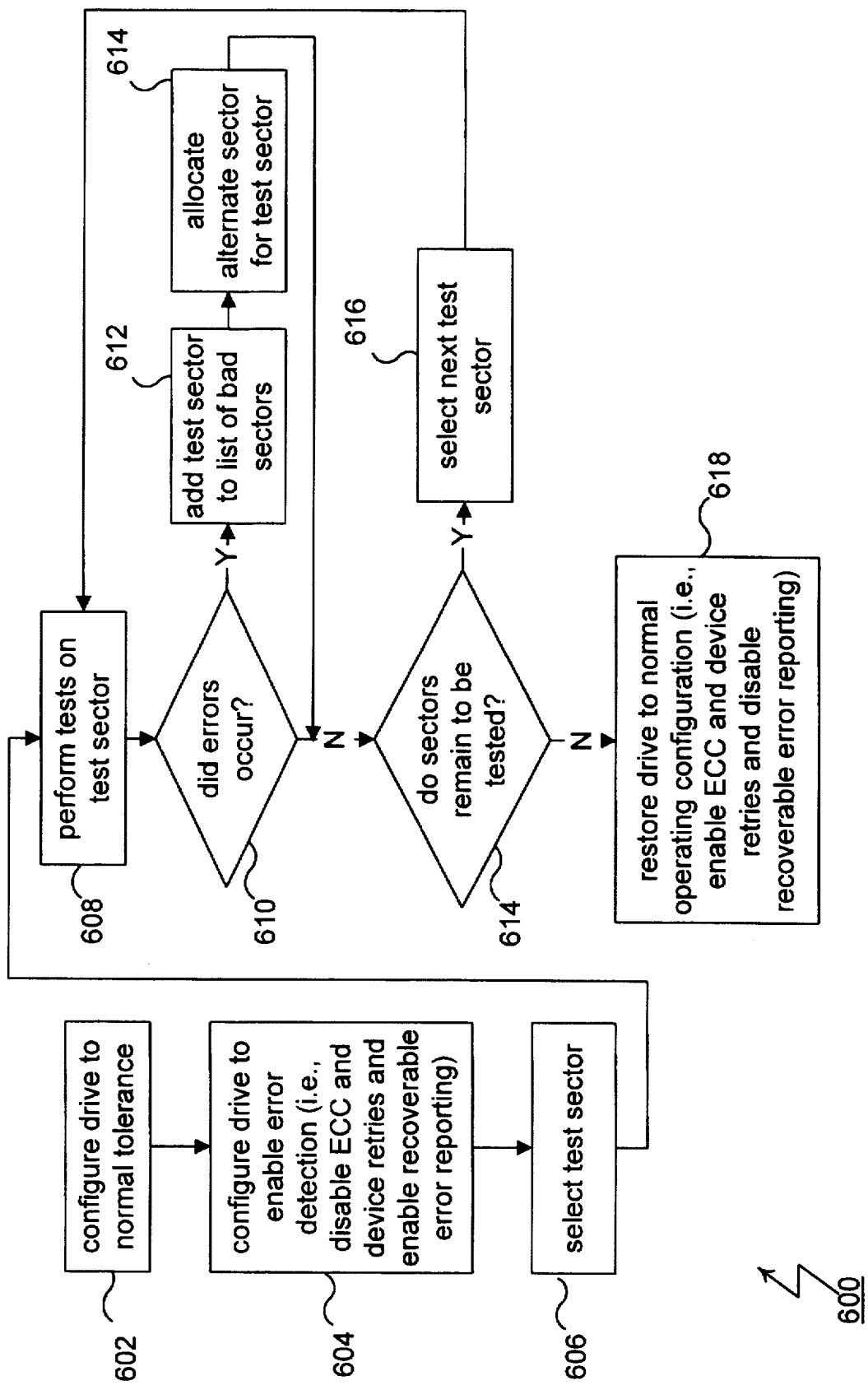
FIG. 6 is a flow chart showing the steps performed during construction of the list of suspected sectors of the present invention.

After construction of the list of suspected sectors, the inline tester is used to construct a flaw map. The method for flaw map construction is shown in FIG. 6 and generally designated 600. Method 600 begins with step 602 where the statistical and diagnostic routines 216 and diagnostic logic section 218 configure the disk drive 200 so that the tolerance of the disk drive 200 to media defects is equal to normal operational levels. In general, this configuration is accomplished by adjusting the disk drive 200 so that read/write head 204 operates at an optimal position. Additionally, the threshold voltages 404a and 404b and the width of the read window 408 are set at optimal levels.

In step 604, the disk drive 200 is further configured by the statistical and diagnostic routines 216 and diagnostic logic section 218 to enable the detection of recoverable errors. More specifically, it is generally the case that disk drives, such as disk drive 200, have a number of features that prevent or mask the occurrence of recoverable errors. In step 604 these features are disabled. Specifically, in step 604, recoverable error reporting is enabled, and the use of error correcting codes and device retries are disabled.

In step 606 the first sector in the list of suspected sectors is selected as the test sector. In step 608, which follows, the selected test sector is tested. In cases where there is no need to protect data on the disk 202, this testing may be performed by repeatedly writing and reading a test pattern using the selected test sector. Alternatively, if the disk 202 contains data that must be protected, the testing may be performed by repeatedly reading the selected test sector.

The testing operations of step 608 are checked for errors in step 610. If errors are found, execution continues at step 612 where the selected test sector is removed from the list of suspected sectors and added to a list of delta defects. The list of delta defects is a list that contains one entry for each sector that is found to produce errors during method 600. The list of delta defects is maintained in a reserved area of the disk 202. Execution then continues at step 614 where an alternate sector is allocated from the reserved area of the drive to replace the test sector. In this fashion, the flaw map of the disk drive 200 is kept up-to-date as additional bad sectors are found within the media of disk 202.

Step 614 determines whether more sectors remain to be tested. In the affirmative case, execution continues at step 616 where the next sector in the list of suspected sectors is selected as the test sector. Following selection of the new test sector, execution returns to step 608 allowing the diagnostic tests to be repeated for each sector in the list of suspected sectors.

When no sectors remain to be tested, execution of method 600 passes to step 618 where the drive 200 is reconfigured to its normal operating configuration. This involves disabling recoverable error reporting, and enabling the use of error correcting codes and device retries.

In general, method 600 provides a technique for rapidly testing the media of disk 202 to detect faulty sectors and allocate replacements. Thus, method 600 will generally be activated as part of the manufacturing process for disk drive 200. Method 600 may also be reactivated at a later time to re-test the disk drive 200 to keep the list of delta defects and the list of suspect sectors up-to-date as additional sectors become faulty.

The present invention incorporates a computer disk drive, such as disk drive 200, that incorporates the method and apparatus as described in the preceding paragraphs with regard to FIGS. 1 through 6. The present invention further incorporates an article of manufacture, which is a computer readable medium such as a floppy disk, optical disk, or hard drive, etc., storing the method and apparatus as described in the preceding paragraphs with regard to FIGS. 1 through 6.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. In a disk drive having media divided into sectors, a method for testing the media, the method comprising the steps, performed by the disk drive, of:

enabling error detection for the disk drive;

reconfiguring the drive to decrease the tolerance of the drive to defects within the media;

testing, in a first testing step, each sector in the media; and adding each sector that generates an error during the first testing step to a list of suspected sectors within the disk drive media.

2. A method as recited in claim 1 further comprising the steps of:

re-enabling error detection for the disk drive;

reconfiguring the drive to set the tolerance of the drive to defects within the media to a normal level;

testing, in a second testing step, each sector in the media;

adding each sector that generates an error during the second testing step to a list of bad sectors; and allocating an alternate sector for each sector that generates an error during the second testing step.

3. A method as recited in claim 2 wherein the second testing step further comprises the steps of:

writing a test pattern into each sector of the media, and reading the test pattern in each sector of the media.

4. A method as recited in claim 3 wherein the steps of writing a test pattern and reading the test pattern are repeated using a plurality of test patterns.

5. A method as recited in claim 2 wherein the second testing step further comprises the step of repeatedly reading each sector of the media.

6. A method as recited in claim 1 wherein the first testing step further comprises the steps of:

writing a test pattern into each sector of the media; and reading the test pattern in each sector of the media.

7. A method as recited in claim 6 wherein the steps of writing a test pattern and reading the test pattern are repeated using a plurality of test patterns.

8. A method as recited in claim 1 wherein the disk drive has a read/write head and the step of reconfiguring the drive further comprises the step of adjusting the position of the read/write head to be offset from the position of the sectors within the media of the drive.

9. A method as recited in claim 1 wherein the disk drive has a discriminator circuit with an adjustable sampling window and the step of reconfiguring the drive further comprises the step of adjusting the width of the sampling window to a non-optimal value.

10. A method as recited in claim 1 wherein the disk drive has a read/write head producing an analog signal and a discriminator circuit for digitizing the analog signal, the discriminator circuit detecting inflection points within the analog signal and expecting the analog signal to correspond to a digital one or digital zero within a predetermined period after each inflection point and wherein the step of reconfiguring the drive to decrease the tolerance of the drive further comprises the step of adjusting the predetermined period to a non-optimal value.

11. In a disk drive having media divided into sectors, an apparatus for testing the media, the apparatus comprising:

means for enabling error detection for the disk drive;

means for configuring the drive to decrease the tolerance of the drive to defects within the media;

means for testing each sector in the media; and means for adding sectors that generate errors during testing to a list of suspected sectors within the disk drive media.

12. An apparatus as recited in claim 11 further comprising:

means for reconfiguring the drive to set the tolerance of the drive to defects within the media to a normal level;

means for adding sectors that generate errors during testing to a list of bad sectors; and means for allocating an alternate sector for sectors that generate errors during testing.

13. An apparatus as recited in claim 11 wherein the disk drive has a read/write head and wherein the means for configuring the drive to decrease the tolerance of the drive, further comprises means for adjusting the position of the read/write head to be offset from the position of the sectors within the media of the drive.

14. An apparatus as recited in claim 11 wherein the disk drive has a discriminator circuit with an adjustable sampling window and wherein the means for configuring the drive to decrease the tolerance of the drive further comprises means for adjusting the width of the sampling window to a non-optimal value.

15. An apparatus as recited in claim 11 wherein the disk drive has a read/write head producing an analog signal and a discriminator circuit for digitizing the analog signal, the discriminator circuit detecting inflection points within the analog signal and expecting the analog signal to correspond to a digital one or digital zero within a predetermined period after each inflection point and wherein the means for configuring the drive to decrease the tolerance of the drive further comprises means for adjusting the predetermined period to a non-optimal value.

16. In a disk driving having media divided into sectors, a method for testing the media, the method being executable by the disk drive and comprising the steps of:

testing the drive sectors at a decreased tolerance to defects within the media;

adding each sector that generates an error during the first testing step to a list of suspected sectors;

testing the drive sectors from the list of suspected sectors at a normal tolerance to defects within the media;

adding each sector that generates an error during the second testing step to a list of bad sectors; and allocating an alternative sector for each sector that generates an error during the second testing step.

* * * * *